United States Patent
Bang et al.

(10) Patent No.: US 8,882,946 B2
(45) Date of Patent: Nov. 11, 2014

(54) ULTRASONIC SEALING JAW AND METHOD FOR ULTRASONIC SEALING

(75) Inventors: Mogens Moller Bang, Odense SV (DK); Peter Astrup Simmelsgaard, Vissenbjerg (DK)

(73) Assignee: 3L Ludvigsen A/S, Tommerup (DK)

( * ) Notice: Subject to any disclaimer, the term of this patent is extended or adjusted under 35 U.S.C. 154(b) by 348 days.

(21) Appl. No.: 13/378,790

(22) PCT Filed: Jun. 16, 2010

(86) PCT No.: PCT/DK2010/050144
§ 371 (c)(1),
(2), (4) Date: Dec. 16, 2011

(87) PCT Pub. No.: WO2010/145667
PCT Pub. Date: Dec. 23, 2010

(65) Prior Publication Data
US 2012/0111476 A1    May 10, 2012

(30) Foreign Application Priority Data
Jun. 17, 2009    (EP) .................... 09162946

(51) Int. Cl.
| | |
|---|---|
| *B32B 37/00* | (2006.01) |
| *B29C 65/00* | (2006.01) |
| *B29C 65/08* | (2006.01) |
| *A61J 1/14* | (2006.01) |
| *B31B 19/84* | (2006.01) |
| *B31B 19/64* | (2006.01) |
| *A61J 1/10* | (2006.01) |
| *B29L 31/00* | (2006.01) |

(52) U.S. Cl.
CPC ........... *B29C 65/08* (2013.01); *B29C 66/83221* (2013.01); *B29C 66/346* (2013.01); *B29C 66/92611* (2013.01); *B29C 65/088* (2013.01); *B29C 66/53263* (2013.01); *B29C 66/81423* (2013.01); *B29C 66/326* (2013.01);
(Continued)

(58) Field of Classification Search
USPC ................. 156/64, 69, 73.1, 290, 292, 308.2, 156/308.4, 580.1, 580.2
See application file for complete search history.

(56) References Cited

U.S. PATENT DOCUMENTS

| | | | | |
|---|---|---|---|---|
| 5,364,385 A | * | 11/1994 | Harms et al. .................. | 604/410 |
| 2011/0266184 A1 | * | 11/2011 | Suzuki et al. .............. | 206/524.1 |
| 2011/0303345 A1 | * | 12/2011 | Grass et al. .................. | 156/73.1 |

FOREIGN PATENT DOCUMENTS

| | | |
|---|---|---|
| DE | 296 12 778 U1 | 9/1996 |
| EP | 0 606 526 A2 | 7/1994 |

(Continued)

*Primary Examiner* — James Sells
(74) *Attorney, Agent, or Firm* — Nath, Goldberg & Meyer; Jerald L. Meyer

(57) ABSTRACT

An ultrasonic sealing jaw (1) is used for sealing portions of plastic film to a tube so as to form a sealing engagement of the portions of plastic film around the circumference of the tube. The sealing jaw (1) includes a concave film-tube welding portion (7) for receiving the tube covered by the plastic films the film-tube welding portion (7) to form the film-tube attachment. Adjacent to at least one side of the film-tube welding portion (7) of the sealing jaw (1), is a substantially flat film-film welding portion (3, 4) for engaging the plastic film and sealing adjacent portions of plastic film to each other in an area adjoining the tube. A film-film welding portion (3, 4) defining a top plane (10) of the sealing jaw (1) has at least one recess with a surface (11) so as to form a cavity (12) and forms a cavity (12) with an opening towards the film-tube welding portion (7).

16 Claims, 8 Drawing Sheets

(52) U.S. Cl.
CPC ......... *B29C 66/3452* (2013.01); *B29C 66/9512* (2013.01); *B29C 66/242* (2013.01); *B29C 66/81433* (2013.01); *A61J 1/1475* (2013.01); *B31B 19/84* (2013.01); *B29C 66/92* (2013.01); *B31B 2219/6038* (2013.01); *B29K 2995/0069* (2013.01); *B29C 66/53262* (2013.01); *B29C 66/81431* (2013.01); *B29C 66/80* (2013.01); *B29C 66/81417* (2013.01); *B31B 19/64* (2013.01); *B29C 66/1122* (2013.01); *B31B 2219/9054* (2013.01); *A61J 1/10* (2013.01); *B29C 66/344* (2013.01); *B29L 2031/7148* (2013.01)
USPC ........................................ 156/73.1; 156/580.2

(56) References Cited

FOREIGN PATENT DOCUMENTS

| | | | |
|---|---|---|---|
| EP | 0 661 208 | A1 | 7/1995 |
| EP | 1 127 793 | A2 | 8/2001 |
| EP | 1 677 966 | | 7/2006 |
| GB | 2 193 485 | A | 2/1988 |
| JP | 59178215 | A | 10/1984 |
| JP | 60-15128 | A | 1/1985 |
| JP | 03-49762 | A1 | 3/1991 |
| JP | 2791387 | B2 | 8/1998 |
| WO | 2004/039562 | A1 | 5/2004 |

\* cited by examiner a)

b)

ULTRASONIC SEALING JAW AND METHOD FOR ULTRASONIC SEALING

This is a National Phase Application filed under 35 U.S.C. 371 as a national stage of PCT/DK2010/050144, filed Jun. 16, 2010, and claiming the benefit from European Application No. 09162946.9, filed Jun. 17, 2009, the content of which is hereby incorporated by reference in its entirety.

TECHNICAL FIELD

The invention relates to an ultrasonic sealing jaw according to the preamble of claim 1 and a method for ultrasonic sealing according to the preamble of claim 15.

The invention relates to an ultrasonic sealing jaw for sealing portions of plastic film to a tube so as to form a sealing engagement of the portions of plastic film around the circumference of the tube, the sealing jaw comprising a concave film-tube welding portion for receiving the tube covered by the plastic films the film-tube welding portion being adapted to form the film-tube attachment, and, adjacent to at least one side of the concave portion of the sealing jaw, a substantially flat film-film welding portion for engaging the plastic film and sealing adjacent portions of plastic film to each other in an area adjoining the tube, said film-film welding portion defining a top plane of the sealing jaw.

BACKGROUND

Liquid container bags, such as bags for drinks, or drainage bags, such as urine bags, blood bags and the like, are usually made from two superposed plastic films, which are welded together along their periphery. For providing the bag with an outlet channel it is common to weld a tube between the two plastic films to provide communication via the tube between the interior and the exterior of the bag. One of the plastic films is thus welded on to one half of the periphery of the tube and the other plastic film is welded on to the other half of the periphery of the tube. The two plastic films are welded together on both sides of the tube. However, optionally, the films may only be welded to the tube at the transition areas on each side of the tube, the films being drawn tightly over the periphery of the tube to avoid leakage. Optionally, an adhesive may be provided between the films and the periphery of the tube.

In practice it has proved difficult to obtain a liquid-tight connection between the outer face of the tube and the plastic films in the two transition areas in which the outer face of the tube and the two plastic films meet. Even though two welding jaws are used, which each in a cross-sectional view has a semi-circular shape and jointly in closed position define a circular opening corresponding to the external diameter of the tube, leaks often arise in the mentioned areas at the transition from the film-tube attachment to the film-film attachment.

A further challenge is aligning the seal around the tube with a given feature on the plastic film so as to form a liquid proof connection between the tube seal and the given feature. For example, in the production of a liquid container, the seal around a tube may need to be brought into overlapping alignment with a sealing seam of a pre-fabricated liquid container bag into which the tube is to be mounted. Such further process specifications/constraints/requirements that have to be fulfilled by the tube sealing makes it increasingly difficult to find a window of process parameters that produces an overall satisfactory tube seal when using known sealing jaws/processes.

EP 1 677 966 B1 discloses a method and apparatus for tube welding, wherein the tube is arranged between two parallel plastic films. The plastic films are welded by means of welding jaws to the outer face of the tube and welded together in the area adjoining the tube to form a joint face. The tube is deformed during welding by means of a compressive force applied by the welding jaws to provide the outer surface of the tube with a substantially plane portion extending on both sides of the joint face and substantially perpendicular thereto.

Despite the improvements achieved by the method and apparatus according to EP 1 677 966 B1, problems may still arise in the above-mentioned transition areas, in particular when trying to satisfy the further constraints of the tube welding process, i.e. provide satisfactory results for welding the plastic films together and/or sealing the plastic films to the tube and/or aligning the tube seal with given features. The problem of simultaneously satisfying the process constraints for the film-to-film attachment, the film-to-tube attachment and for the transition areas in one ultrasonic process becomes even more pronounced for thin plastic films with a thickness well below 0.15 mm. Problems observed in practice include excessive hardening of the film, burning and cutting of the film, unsatisfactory attachment of the film to the tube, and leaks particularly along the tube in the two transition areas in which the outer face of the tube and the two plastic films meet.

Other known apparatus and methods for sealing a tube into an opening of a bag formed by plastic film address the problem of providing a seal in the transition area between the film-film attachment and the film-tube attachment by partially melting and moulding the material of the tube so as to fill the critical gap. Examples for such solutions requiring the melting and deformation of the tube material and/or protrusions provided thereon may be found for example in JP 2 791 387 or DE 29 612 778 U1. Common for these solutions is that a recess or chamfer/bevel is provided in the portion of the welding jaws where the plastic film is welded to tube material, i.e in the film-tube portion of the respective welding jaws, wherein the tube material has been melted and moulded according to the shape of that recess during the film-to-tube welding process. Such a sealing process thus requires at least a partial melting of the tube material and has the disadvantage of imposing narrow restrictions on the choice of process compatible tube/film materials. Furthermore, the partial melting of the tube implies in many cases a softening of the tube structure and may require the use of stiffening means inside the tube, such as a mandrel in order to avoid a collapse of the tube during the welding operation. This adds to process complexity and cost.

DISCLOSURE OF THE INVENTION

Object of the invention is to provide an improved method and apparatus for ultrasonic sealing of two portions of plastic film to a tube so as to provide a liquid-tight joint between the plastic film and the tube, while at the same time providing satisfactory/viable attachment of the plastic film to the tube and of the portions of plastic film to each other in the regions adjoining the tube.

According to the invention the object is obtained using an ultrasonic sealing jaw of the above-mentioned type being characterised in that the substantially flat film-film welding portion comprises along the edge towards the film-tube welding portion at least one recess with a surface so as to form a cavity with an opening towards the film-tube welding portion.

Without being bound by theory, when operating two cooperating sealing jaws for sealing a tube in between portions of film, a processing pressure exerted on the film and the film-tube interface by the film-tube welding portion of the sealing jaw, is essentially determined by the geometry of the film-tube welding portion, whereas the processing pressure exerted on the film and the film-film interface by the film-film welding portion of the sealing jaw is essentially determined by a clamping force applied to the cooperating sealing jaws in a direction essentially perpendicular to the joint face of the cooperating jaws.

The recess in the film-film welding portion of the sealing jaw is configured to reduce the pressure exerted by the sealing jaw in a proximal region of the film-film welding portion next to the film-tube welding portion as compared to the pressure exerted by a distal region of the film-film welding portion, the distal portion being located adjacent to the proximal region and extending away from the film-tube welding portion.

For each sealing jaw, the top plane may be used as a level reference plane for defining/measuring level differences with respect thereto.

Surprisingly, by removing material from the sealing jaw so as to form a recess in the film-film welding portion at the edge towards the film-tube welding portion, it has been possible to fill out and seal the gap otherwise often formed in the critical transition areas, in which one of the plastic films changes from being sealed together with the other plastic film to being sealed to the plastic tube. As mentioned above, such leakage gaps arise frequently when using known sealing jaws not being provided with such a recess according to the invention. When using sealing jaws according to the invention, very reliable liquid-tight seams are obtained in these critical areas, in particular when welding thin films. Furthermore surprisingly, by providing the recess in the film-film welding portion instead of in the film-tube welding portion of the sealing jaw, such a seal may be achieved essentially independent of the tube material and without the need for melting and moulding of the tube.

The recess is formed in the flat film-film welding portion adjacent to the concave film-tube welding portion, extends to the concave film-tube welding portion and comprises at least one opening from the cavity of the recess to the concave film-tube welding portion. In operation, the top plane of the flat film-film welding portion of a first sealing jaw exerts a pressure on the plastic films against the top plane of a second cooperating jaw opposite to the first sealing jaw. By forming the recess in the flat film-film welding portion next to the concave film-tube welding portion, the surface of the sealing jaw is maintained at a distance from the top plane in the critical region of the seal, where the film-to-film surface joint branches to enclose the tube. Thereby the pressure applied to the plastic films in the region of the recess is reduced.

For cooperating sealing jaws of the above mentioned type, the respective flat portions of the cooperating sealing jaws may contact each other, the contact surface defining a joint face. Bringing cooperating sealing jaws together in an operational configuration without intermediate material such that the cooperating sealing jaws contact each other in the joint face, the respective top planes of the two sealing jaws coincide and comprise the joint face.

Without being bound by theory, the amount of ultrasonic energy transferred to the plastic films in the region of the recess may be assumed to be reduced as compared to a known sealing jaw without the recess, thereby reducing the risk for burning the plastic films close to the above mention branching point. The recess is for a given sealing jaw, that is designed to provide both satisfactory film-to-film and film-to-tube attachment, chosen such as to reduce the risk for burning/cutting/destroying/affecting the plastic films in the transition region close to the tube, while keeping the surface of the ultrasonic sealing jaw sufficiently close to the plastic films in order to transfer enough energy to form a sealing seam along the tube.

The seal in the critical transition region may essentially be achieved by only moulding the material of the plastic film to bring it into sealing engagement with the tube. A surface deformation/melting of the tube may occur, but is not required for the seal. Thereby it is achieved that the constraints imposed by the tube material on the window of process parameters for viable seals are relaxed, or alternatively, the choice of compatible tube/film materials combinations for which a viable seal may be achieved is greatly enhanced.

Even though it normally is preferable to arrange the plastic tube between two container walls of plastic film such that a sealing seam extends between the two layers of plastic film on both sides of the plastic tube, the plastic tube may, however, also be arranged at an edge of the container such that the same plastic film extends 360° around the plastic tube and such that only one sealing seam extends between the two layers of plastic film on one side of the plastic tube.

It should also be noted that even though the plastic film commonly is subject to ultrasonic welding to achieve the sealing bond to the tube and/or the other portion, a liquid tight seal may also be achieved by other forms for attachment involving the induction of ultrasonic energy into at least portions of the attachment region, such as bonding, gluing or clamping. For example, the plastic film may be kept in liquid tight engagement with the tube by tensile forces stretching the plastic film between attachment points around the tube, thereby achieving a force-fit type seal and keeping the tube in place by a friction-lock interaction between the plastic film and the tube. This form of seal is of particular importance for combinations of tube and film materials that are not well suited or even incompatible for attachment to each other by ultrasonic welding. In such cases, the formation of a liquid-tight seam along the tube in the transition region where the film-to-film surface joint branches to enclose the tube between the plastic films is even more critical as the tensile forces will tend to form a leakage channel along the tube. An advantage of the ultrasonic welding jaw according to the invention is that a liquid-tight seam may also be achieved in such critical processes without compromising the overall quality of the seal of the liquid container bag around the tube.

The concave film-tube welding portion may have a substantially semicircular cross-section for receiving tubes of substantially circular cross-section and for clamping the portions of plastic film around the tube by cooperating with a second jaw with a substantially semicircular concave portion. However, the tube may at its end be provided with a connector part to which the portions of plastic film are to be sealed, the connector part having any cross-sectional shape. The connector part may be integrally formed with the tube or a separate connector provided at/attached to the end of the tube. Also in such a case, the cross-section of the concave film-tube welding portion will be formed substantially according to the cross-sectional shape of the connector part of the tube. The shape and/or dimensions of the concave film-tube welding portion may be chosen to slightly deviate from the actual shape and/or dimensions of the tube so as to exert compressive forces on the tube during the sealing operation.

At least one recess is provided on a flat film-film welding portion adjacent to the concave film-tube welding portion of the sealing jaw. The size of the recess is to be dimensioned according to the constraints of the particular sealing application, i.e. depending on the material properties of the plastic films and/or of the tube, such as melting point, rigidity, wall thickness, film thickness, welding compatibility of adjoining materials and the like.

A very small recess will give a very small window of viable process parameters, so that process parameters such as exposure time and clamping force only can be varied within narrow tolerances to provide a satisfactory seal. A very small recess will therefore require higher precision of the production apparatus which at the limit is either too expensive for competitive production or too unstable to be used for reliable production on a larger scale.

A very large recess gives a very wide seam for sealing the plastic film along the tube, and makes it difficult to control the distribution of heat induced by the ultrasonic energy to the plastic films in the region of the recess. As a consequence the process becomes difficult to control, thereby making it difficult to set up a reliable production on a large scale.

Advantageously, the surface of the recess extends from a first point A located at the film-tube welding portion at a level h below the top plane to a second point B located in the top plane at a distance L from the first point A in a direction away from the film-tube welding portion and parallel to the top plane, wherein the point A defines the intersection of the surface of the recess with the film-tube welding portion and point B defines the intersection of the surface of the recess with the top plane as seen in a cross-sectional view.

The surface of the recess thus intersects with the film-tube welding portion in a first point A at a level h below the top plane and with the top plane at a second point B, the second point B being located at a distance L from the first point A in a direction away from the film-tube welding portion and parallel to the top plane. The distance L and the level h thus define the size of the recess in a cross-sectional plane perpendicular to the substantially lengthwise direction of the tube.

As indicated above, a tool set typically comprises two or more sealing jaws which cooperate to enclose the plastic film and the tube for the formation of the seal. Adjacent jaws of the tool set meet at joint faces. Portions of plastic film may be welded together between adjacent jaws at any of these joint faces. A sealing operation thus implies at least a first sealing jaw and a second sealing jaw cooperating with the first sealing jaw, the sealing jaws together enclosing the plastic films and the tube when applying ultrasonic energy to form the seal. The size of the recess, i.e. the choice of L and h, will also depend on whether or not the surface of the second, cooperating sealing jaw is provided with a corresponding recess according to the invention opposite to the recess provided on the first sealing jaw.

Designing a sealing jaw according to the invention for a specific application, the skilled person is instructed to reduce the effect of excess heat build-up in the transition region by increasing the distance L, while avoiding an inappropriate heat distribution over the region of the recess when the recess is too wide, i.e. when the distance L is chosen too large. The skilled person is further instructed to reduce the effect of excess heat build-up by deepening the recess, and avoiding an insufficient heat transfer/pressure to form a sealing seam when the recess is too deep. A recess with a level h/distance between the recess surface and the top plane exceeding the thickness of the plastic film is typically too deep.

Advantageously on a sealing jaw according to the invention, the distance L is at least 0.1 mm, alternatively 0.2 mm preferably at least 0.3 mm, most preferably at least 0.5 mm and L is less than 10 mm, alternatively less than 5 mm, preferably less than 3 mm.

The appropriate choice of L depends on the specific sealing application and may be influenced by application specific parameters such as the thickness of the plastic film, film and/or tube material properties, and the like. Under operation, a clamping force is applied to cooperating sealing jaws. Thereby, a pressure is exerted on the film resulting in a deformation of the film. The deformation, in particular when pressing a thick film, may also comprise a component in a direction parallel to the top plane, i.e. in a direction substantially perpendicular to the direction of the applied pressure.

In the region of the recess, the pressure applied by the flat portion of the sealing jaw on the film is reduced as compared to the regions of the flat portion arranged in/defining the top plane. Choosing the distance L according to the sealing application therefore allows to control the reduction in pressure in the region of the recess and to optimise/maximise the window of viable process parameters leading to satisfactory seals.

The short L distance is particular beneficial in cases of very thin films with a film thickness below about 0.1 mm, or coated films, such as those used for drinking bags, having a thin film coating on the inside of an aluminium film. In such cases it may often be preferred to have a short L distance in order not to burn through the thin coating and still achieve a tight seal.

The long L distance is for very thick films with a film thickness of above about 0.2 mm. In these cases, a large window of L is preferred, because such thick films will deform much compared to the depth, h, of the recess, and there will be plenty of material to fill the recess.

For thin films, of about 0.05 mm to 0.2 mm, a medium size of L is beneficial. This choice of the distance L both allows for a large parameter window (time and pressure) and for a very high success rate of the weld.

Further advantageously, on a sealing jaw according to the invention, the level h is between 0.01 mm and 0.3 mm, alternatively between 0.01 mm and 0.15 mm, preferably between 0.01 mm and 0.1 mm.

The level h is important in order to form a recess of which the pressure build up is sufficient in order for the weld to be performed. If h is to large compared to the thickness of the film material, only a minor pressure will be build up in the recess area resulting in low energy transfer to that region. Pressure and time are the two main parameters in transferring sufficient energy to a certain point using ultrasonic welding. If the pressure is low the time must be long. However in some cases a very long welding time may cause a burn through in some areas of high pressure. Thus, the level h must always be seen in combination with length L and the geometrical shape of the recess from point B to A in close consideration together with parameters such as material thickness, and the overall design of the sealing jaw.

According to one embodiment of the sealing jaw according to the invention, the distance between the surface of the recess and the top plane is largest at the opening towards the film-tube welding portion as seen in the direction perpendicular to the top plane.

By that shape of the recess surface it is achieved, that the pressure that is applied to the film by the film-film welding portions of cooperating sealing jaws in the region of the recess is lowest directly adjacent to the film-tube welding portion.

Such a geometrical shape of the recess is beneficial in order to create a material flow and pressure build up, starting at point B towards point A.

According to a further development of the above embodiment of the sealing jaw the surface of the recess monotonously approaches the top plane as seen in the direction from the film-tube welding portion towards the film-film welding portion.

The term monotonous approach is to be understood as from the mathematical definition of monotonous. That is, following the surface of the recess along a line going directly from the first point A at the film-tube welding portion to the second point B on the film-film welding portion, the distance between the surface of the recess and the top plane decreases or stays the same, but does not increase along this path. Eventually, going from the first point A at level h to the second point B located on the film-film welding portion in the top plane a level difference corresponding to level h is overcome.

By that shape of the recess surface it is achieved, that under operation the pressure that is applied by the film-film welding portion of cooperating sealing jaws to the film gradually/monotonously decreases when approaching the film-tube welding portion from a distal point on the surface of the film-film welding portion.

Further according to one embodiment of a sealing jaw according to the invention the surface of the recess comprises a step edge with a level difference d at point B, a first area extending from the step edge to an intermediate point P, the first area being parallel to the top plane at a distance d thereto, and a second area extending from the intermediate point P to point A at the film-tube welding portion, wherein the distance of the second area to the top plane gradually increases from the distance d at the intermediate point P to level h at point A, wherein h is larger than d.

According to a preferred embodiment of a sealing jaw according to the invention, the second area is a plane that is inclined towards the film-tube welding portion by an angle α with respect to the top plane, wherein the angle α is between 0.05 degrees and 20 degrees, alternatively between 0.2 degrees and 10 degrees, preferably between 0.5 and 5 degrees.

The angle α controls how the pressure is distributed in the recess area. The angle α will also depend upon the distance L of the recess, in particular under the constraints of on the final level h at point A within the limits of the above-mentioned preferred embodiment.

This embodiment also has the advantage that the production of the sealing jaw is more simple and reliable while giving a good control over the pressure distribution in the vicinity of the film-tube welding portion.

Due to the very small dimensions in many cases of the recess area, the machining can be difficult and thus also the quality control of the machined parts. The use of a planar surface arranged at an angle, compared to e.g. a curved profile, helps to ensure a very high repeatability in the machining process which is very important to ensure the high success rate of the welding process.

According to a preferred embodiment of a sealing jaw according to the invention, a substantially flat film-film welding portion is provided on either side of the concave film-tube welding portion. Typically, the film-film welding portions define a common top plane of the sealing jaw. This embodiment allows to easily clamp the tube and the plastic films with cooperating sealing jaws, wherein at least one of the film-film welding portions is provided with a recess according to the invention. By choosing the film-film welding portions on either side to be arranged within the same plane, the top plane, the pressure resulting from clamping the cooperating sealing jaws and exerted on the plastic film has the same direction for both film-film welding portions, preferably substantially perpendicular to the plane of the plastic film(s).

According to a further preferred embodiment of a sealing jaw according to the above-mentioned embodiment, both film-film welding portions comprise at least one recess so as to form a cavity with an opening towards the film-tube welding portion. Thereby a cavity is formed on either side of the film-tube welding portion and directly adjacent thereto, so as to reduce the clamping pressure applied to the plastic films by the film-film welding portions in the region directly adjacent to the tube on both sides of the tube.

According to a further embodiment of a sealing jaw according to the invention, the film-film welding portion comprises at least one depression.

The one or more depressions may be provided as knurling/channelling/milling/fluting or larger depressed areas, wherein the depressions are at least partially enclosed by the regions of the film-film welding portion that are arranged in the top plane.

By these depressions in the film-film welding portion, a better process control is achieved in the region of the film-to-film attachment. Under operation, the regions of the film-film welding portions of the sealing jaw that are arranged in the top plane engage first to contact the plastic film and define a pressure according to a clamping force applied to cooperating sealing jaws. Transmitting ultrasound through at least one of the sealing jaws, ultrasonic energy is transferred to the plastic films so as to form a reliable film-to-film attachment with a seam in the regions of the film-film welding portion(s) arranged in the top plane. Depending on their depth, depressions in the film-film welding portions, i.e. regions of the film-film welding portions arranged below the top plane, may or may not engage the plastic film during the sealing process. In either case, less or no energy is transferred to the plastic film by the depressed regions of the film-film welding portion and a film-to-film attachment/surface joint between portions of plastic film is not necessarily formed by the depressed regions of the film-film welding portion. The depressed regions may act as a buffer for locally absorbing excess energy introduced into the films through the elevated regions of the film-film welding portion(s), the elevated regions being arranged in the top plane. Thereby excessive build-up of heat energy in the seam-forming region is avoided and the sealing process is stabilised.

At point B a barrier of width w may be formed between the recess and the depression. In the region of the barrier, the surface of the film-film welding portion substantially follows the top plane. By providing a barrier adjacent to the recess it is achieved, that a well defined seam is formed along a line next to the recess, preferably along a line following the axial direction of the tube. The barrier may be provided as a continuous line so as to form a continuous seam, or alternatively as a broken line so as to form a dashed/dotted seam.

According to a further embodiment of a sealing jaw according to the invention, the film-film welding portion as seen in a direction perpendicular to the top plane has a first leg along the edge towards the film-tube welding portion and at least a second leg connected to the first leg and pointing away from the film-tube welding portion.

The first leg provides a well defined seam along the axial direction of the tube. The one or more secondary legs provide sealing seams for the film-to-film attachment in a direction away from the tube, thereby in a simple manner providing means for reducing precision constraints for aligning the tube seal with a given feature on the plastic film.

The longer the secondary legs extend away from the tube, the less critical are the precision constraints for aligning the tube seal with the given feature. Excessive heat build-up in the film-film welding regions is avoided by keeping the width of the legs narrow with respect to characteristic lengths for heat transport and dissipation in a given combination of film materials and thickness.

According to a preferred embodiment, the first leg is arranged substantially parallel to an axial direction of the film-tube welding portion/tube. The at least one second leg provides an extension of the film-film welding portion and may be arranged in a direction substantially perpendicular to said axial direction of the film-tube welding portion/tube.

In combination, the first and second legs may form any outline shape as seen in a direction perpendicular to the top plane. In this embodiment, the recess is provided in the first leg and along the edge of the film-film welding portion facing towards the film-tube welding portion.

For example, an ultrasonic sealing jaw according to this embodiment may comprise flat film-film welding portions having a T-shape outline, wherein the first leg forms the top bar of the capital T and a single secondary leg forms the stem of the T pointing away from the film-tube welding portion.

Alternatively, a U shaped outline of the flat film-film welding portion as seen in a direction perpendicular to the top plane may be contemplated, wherein the bottom of the U forms the first leg and the legs of the U-shape form the secondary legs pointing away from the film-tube welding portion.

T-shaped and/or U-shaped outlines may be combined to form a comb-shaped outline, the comb having a backbone forming the first leg and teeth forming the secondary legs pointing away from the film-tube welding portion.

According to a further aspect of the invention an apparatus for ultrasonic sealing of portions of plastic film in sealing engagement around a tube is provided, the apparatus comprising cooperating sealing jaws configured to close around the tube and the portions of plastic film, so as to apply a pressure to the plastic film, and means for transferring ultrasonic energy to the plastic film and/or tube through at least one of the sealing jaws, wherein at least one of the sealing jaws is a sealing jaw according to any of the above-mentioned embodiments of the invention. The advantages of such apparatus are derived from the advantages of the sealing jaws as mentioned above.

According to one embodiment of the apparatus according to the invention, ultrasonic energy with a first frequency is applied to the plastic film and/or the tube through a first sealing jaw and simultaneously ultrasonic energy with a second frequency is applied to the plastic film and/or the tube through a second sealing jaw cooperating with the first sealing jaw.

The two cooperating sealing jaws are each mounted as stationary ultrasonic horns in a respective ultrasonic stack, each comprising an ultrasonic transducer and an optional booster arrangement, wherein the two stacks are operated at different frequencies.

Advantageously, the frequency of the ultrasound is between 10 kHz and 100 kHz, alternatively between 20 kHz and 80 kHz, preferably between 25 kHz and 45 kHz. Further advantageously, the difference in ultrasound frequencies applied through the first sealing jaw and the second sealing jaw is between 100 Hz and 10 kHz, preferably between 100 Hz and 5 kHz, most preferably between 100 Hz and 2 kHz.

According to a further aspect of the invention, a method is provided for ultrasonic sealing of portions of plastic film to a tube so as to form a sealing engagement of the portions of plastic film around the circumference of the tube and sealing the portions of plastic film together in an area adjoining the tube, the method comprising the steps of arranging the tube between the portions of plastic film, engaging the portions of plastic film by means of cooperating sealing jaws, thereby clamping the plastic film around the tube in concave film-tube welding portions of the sealing jaws and pressing abutting portions of plastic film against each other by means of substantially flat film-film welding portions adjoining the film-tube welding portions of the sealing jaws, applying a clamping force to the sealing jaws in a direction substantially perpendicular to the film-film welding portions, thereby exerting a pressure on the plastic film in contact with the sealing jaws, and, by means of the sealing jaws, applying/transmitting/transferring ultrasonic energy to the layers of plastic film and/or tube during an exposure time, wherein the flat portions comprise at least one proximal region extending from a first point A at the film-tube welding portion to a second point B a distance L away from the film-tube welding portion, and at least one distal region extending from the second point B in a direction away from the film-tube welding portion, wherein the pressure exerted on the plastic film by the at least one proximal region is reduced with respect to the pressure exerted by the at least one distal region.

According to one embodiment of the invention, in at least one region of the substantially flat film-film welding portion along an edge towards the film-tube welding portion the pressure exerted on the plastic film decreases starting at a distance L from the tube when approaching the tube.

Clamping the plastic film around the tube implies that the film-tube welding portions of the cooperating sealing jaws at least conform around the tube and plastic film or preferably are adapted to elastically deform the tube with the plastic film around it, thereby applying a compressive force thereto. Therefore, the cross-sectional area of the cavity formed by the film-tube welding portions of the cooperating sealing jaws is approximately the same or less than the cross-sectional area of the tube with the plastic film around it.

Surprisingly, by reducing the pressure exerted on the plastic film by the film-film welding portion in a region along an edge towards the film-tube welding portion or at least partially along the edge, the sealing performance of the process is improved considerably in particular in the region of the transition from the film-to-film surface joint/attachment to the film-to-tube attachment. Thereby, a larger window for viable process parameters providing satisfactory tube seals is obtained, resulting in a less critical process that is more stable and versatile, e.g. with respect to different film/tube material combinations.

According to a preferred embodiment of the above-mentioned method, at least one of the sealing jaws is a sealing jaw according to any of the claims 1-12. Using one or more sealing jaws according to the invention, wherein at least one recess is provided in the film-film welding portion along an edge facing towards the film-tube welding portion, the pressure on the plastic film resulting from the above-mentioned clamping force is reduced locally in the region of the recess. Detailed advantages of the method are derived accordingly from the advantages of the sealing jaws as mentioned above.

BRIEF DESCRIPTION OF THE DRAWINGS

The invention is further explained below with reference to preferred embodiments illustrated in the drawings, in which.

DETAILED DESCRIPTION OF THE INVENTION

Figure 1:
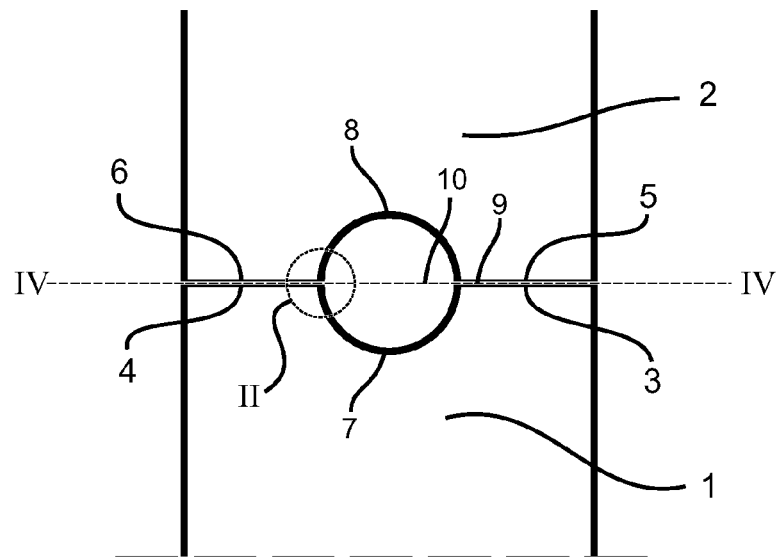
FIG. 1 is a schematic side view of two cooperating sealing jaws according to the invention.

FIG. 1 shows two cooperating sealing jaws 1, 2 each having two film-film welding portions 3, 4 and 5, 6, respectively, and film-tube welding portions 7, 8 of substantially semi-circular cross-section. The two sealing jaws meet at a joint face 9. In the absence of tube or films the most elevated regions of the film-film welding portions 3, 4 and 5, 6 of the ultrasonic sealing jaws 1, 2 contact each other at the joint face 9. The most elevated regions of the film-film welding portions 3, 4, 5, 6 also define the top plane of the respective sealing jaw 1, 2.

In combination, the film-tube welding portions 7, 8 of the cooperating sealing jaws form a cavity for receiving the tube arranged between portions of plastic film, and the film-film welding portions 3, 4 and 5, 6 embrace the portions of plastic film. The embodiment shown in FIG. 1 provides a cavity of substantially circular cross-section for receiving the tube arranged between portions of plastic film.

Circle II indicates one of the critical transition regions, where the film-film welding portions 4, 6 meet the film-tube welding portions 7, 8 of sealing jaws 1, 2 respectively. For a tube seal of a tube between portions of plastic film, this corresponds to the critical transition region of the seal where the plastic films branch from a film-to-film attachment to a film-to-tube attachment on either side of the tube so as to fully enclose the cross-section of the tube.

Figure 2:
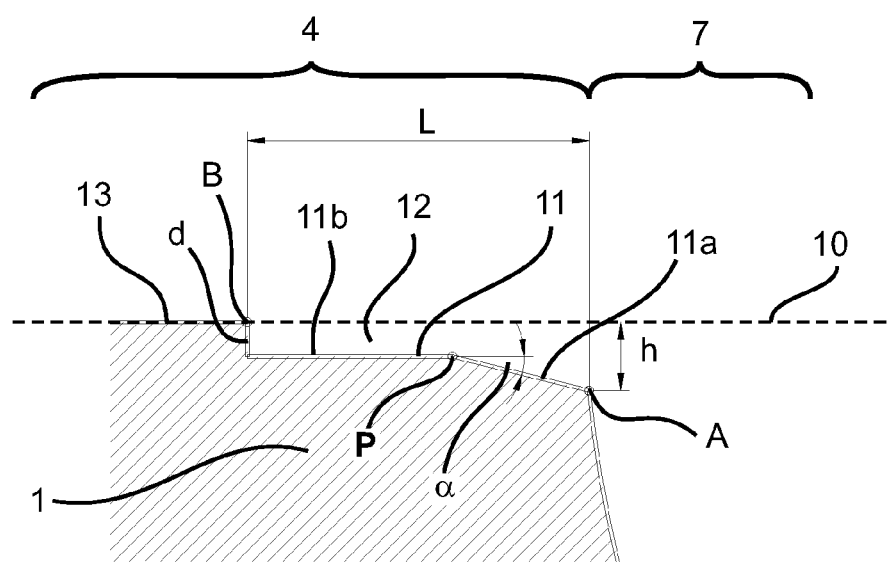
FIG. 2 is a detail of a sealing jaw according to the invention taken at circle II in FIG. 1, FIG. 3*a-k*) gives examples for different shapes of recess surface profiles.

FIG. 2 shows in a cross-sectional view a detail of the sealing jaw 1 in the critical transition region II of FIG. 1. Flat film-film welding portion 4 of sealing jaw 1 is along the edge towards the concave film-tube welding portion 7 provided with a recess 11 forming a cavity 12 that is open towards the concave film-tube welding portion 7. The most elevated regions 13 of the flat film-film welding portion 4 define a top plane 10. Top plane 10 is the level reference plane for measuring/determining level differences of different regions of the flat film-film welding portion 4 with respect to the most elevated regions 13. The surface of the recess 11 intersects with the concave film-tube welding portion 7 at point A at a level h below the top plane 10 and extends away from the concave film-tube welding portion 7 to a point B on the flat film-film welding portion 4, where the surface of the recess 11 intersects with the top plane at a distance L away from the concave film-tube welding portion 7. The surface profile of the recess 11 shown in FIG. 2 comprises a first region 11a extending from point A to an intermediate point P and a second region 11b extending from the intermediate point P to point B. The first region 11a is an inclined plane that is tilted with respect to the top plane by an angle α. The second region 11b is a step edge with a step height d at point B and a planar surface that is substantially parallel to the top plane 10. Depending on the tooling used to produce the sealing jaw, the step edge may have an edge with a surface substantially perpendicular to the top plane 10, and/or have a sloping edge. The profile of the step edge may also comprise curved portions.

Preferred values for the inclination angle α are between 0.05 degrees and 20 degrees, alternatively between 0.2 degrees and 10 degrees, most preferably between 0.5 and 5 degrees.

Preferred values for L are at least 0.1 mm, alternatively at least 0.2 mm, alternatively at least 0.3 mm, most preferably at least 0.5 mm and less than 10 mm, alternatively less than 5 mm, most preferably less than 3 mm.

Preferred values for h and/or d are between 0.01 mm and 0.3 mm, alternatively between 0.01 mm and 0.15 mm, most preferably between 0.01 mm and 0.1 mm.

Figure 3:
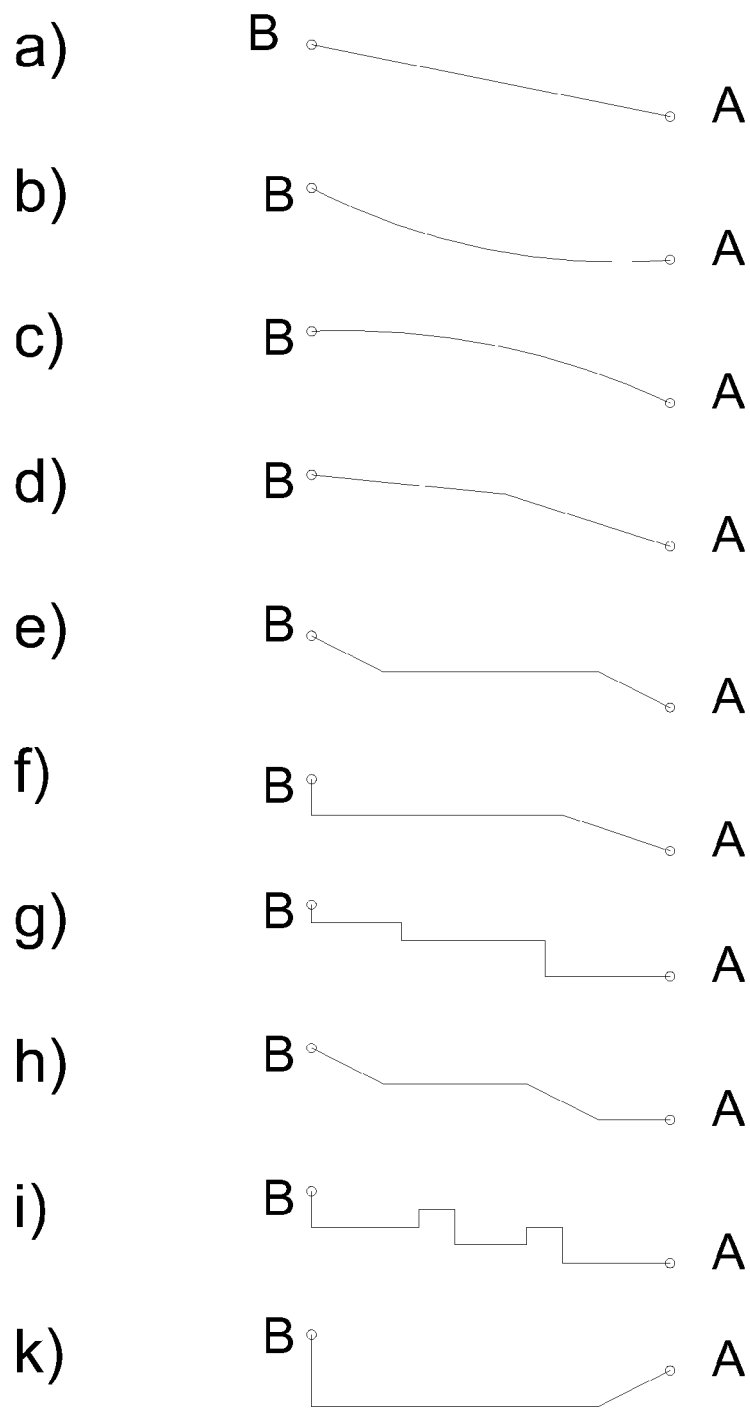

Further examples for cross-sectional surface profiles of the recess are shown in FIG. 3. The examples (a-k) comprise step edges, convexly/concavely curved surfaces, and planar surfaces that may or may not be inclined with respect to the top plane (not shown in FIG. 3) and combinations thereof. For the surface profiles (a-i) the distance of the surface from the top plane is largest at point A where that distance is equal to level h. Surface profiles (a-h) are all examples where the surface of recess 11 approaches the top plane 10 monotonously. Out of these monotonous surface profiles (a-h), the examples (a-d) are strictly monotonous.

Figure 4:
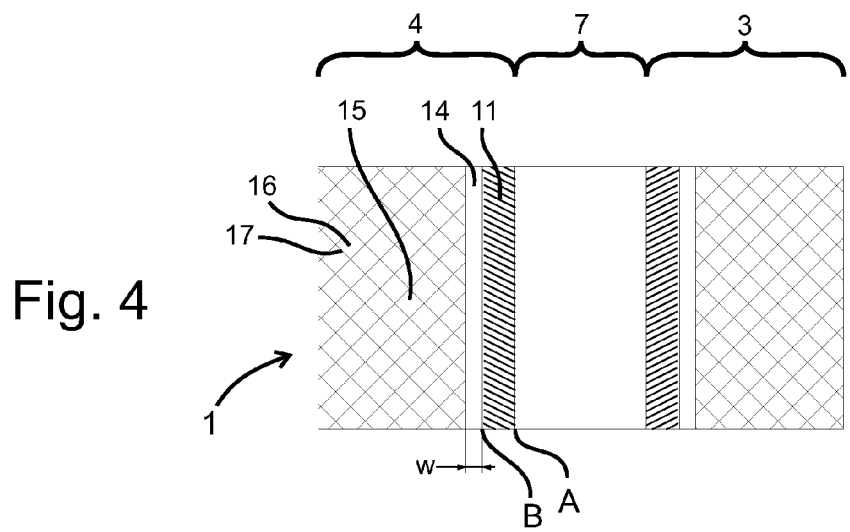
FIG. 4 is a schematic sectional view along line IV-IV in FIG. 1 for one embodiment of a sealing jaw according to the invention, FIG. 5*a-b*) is a schematic sectional view along line IV-IV in FIG. 1 for another embodiment of a sealing jaw according to the invention, FIG. 6a-b) is a schematic sectional view along line IV-IV in FIG. 1 for a further embodiment of a sealing jaw according to the invention, FIG. 7a-d) gives examples for different cross-sectional shapes of tubes/tube connector parts.
Figure 5:
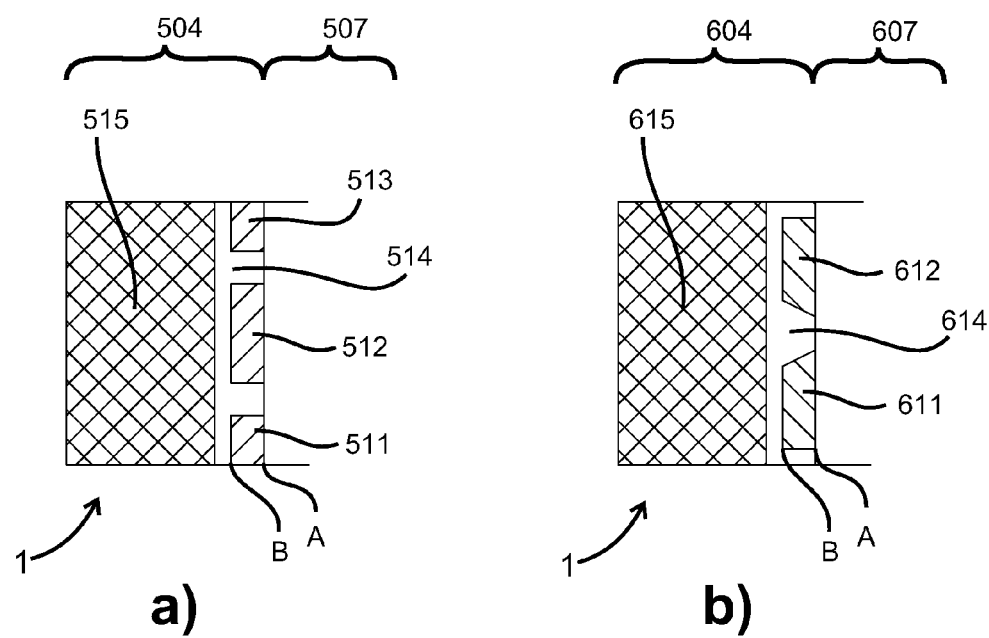
Figure 6:
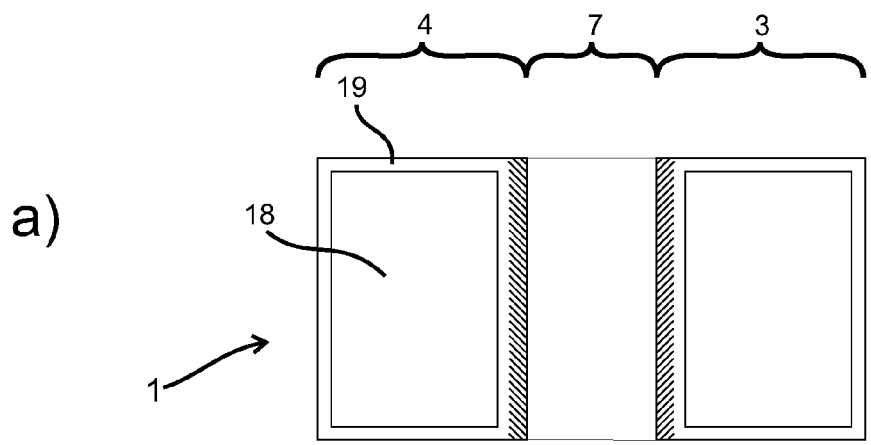
Figure 6:
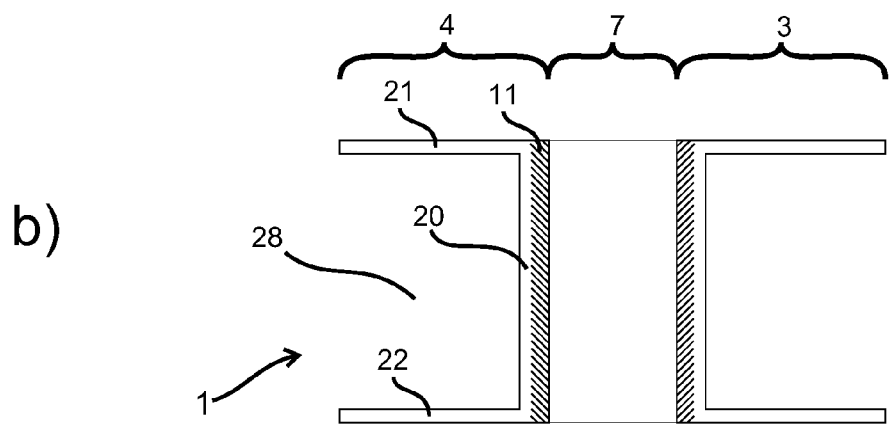

Referring to FIGS. 4-6, a top elevation view of different sealing jaws 1 according to the invention is shown. The view corresponds to section IV-IV in FIG. 1 and shows a central concave film-tube welding portion 7 between adjoining flat film-film welding portions 3, 4 on either side of the concave film-tube welding portion 7.

In the embodiment shown in FIG. 4, the two flat film-film welding portions 3, 4 are configured symmetric about the central concave film-tube welding portion and comprise a recess 11 next to the concave film-tube welding portion 7. Adjoining the recess 11, a barrier 14 of width w is provided where the surface of the flat film-film welding portion 3, 4 follows the top plane. On the distal side of the barrier 14, a knurled region 15 is provided, wherein the knurling is formed as a large number of depressions 16 interspaced/delimited by ribs 17 having a surface in the top plane.

The barrier 14 shown in FIG. 4 is a substantially straight line parallel to the concave film-tube welding portion 7. Alternatively, in another embodiment of the invention (not shown), the barrier may follow the pattern of the knurling formed in the flat film-film welding portion, thus having a zigzag shape in an area adjacent to the concave film-tube welding portion 7 and with a general direction substantially parallel thereto. In yet another embodiment (not shown) the barrier may be made up of islands arranged alongside the concave film-tube welding portion 7, so as to form a broken line between the recess and the distal part 15 of the flat film-film welding portion 4.

The barrier 14 provides a means for controlling/defining the pressure distribution at the transition from the recess 11 to the remaining parts of the flat film-film welding portion 3, 4. Controlling the pressure distribution allows for controlling the deformation of the film clamped between cooperating sealing jaws 1, 2 and/or controlling the transfer of ultrasonic energy during the sealing process. By the different barrier configurations the details of the pressure distribution along the barrier may be determined in order to get certain characteristics of the weld along the concave film-tube welding portion.

FIG. 5 shows the flat film-film welding portion of further embodiments of a sealing jaw according to the invention. In the embodiment shown in FIG. 5a, the flat film-film welding portion 504 comprises adjacent to the concave film-tube welding portion 507 three recess regions 511, 512, 513, wherein the recesses 511, 512, 513 form cavities that are open towards the concave film-tube welding portion 507. The flat film-film welding portion 504 further comprises a barrier region 514 separating the recesses 511, 512, 513 from a larger knurled region 515 arranged in a distal part of the flat film-film welding portion 504. In operation, the barrier region 514 acts to define the pressure on the film in a region of the flat film-film welding portion next to the recesses 511, 512, 513, and the pressure exerted on the plastic film by the flat film-film welding portion 504 in the region defined by the recesses 511, 512, 513 is reduced with respect to said pressure exerted by the barrier region 514.

In yet another embodiment shown in FIG. 5b a flat film-film welding portion 604 comprises adjacent to a concave film-tube welding portion 607 two recesses 611, 612 forming cavities that are open towards the concave film-tube welding portion 607. The recesses 611, 612 are separated from a knurled region 615 by a barrier region 614.

Further embodiments of a sealing jaw according to the invention are shown in FIG. 6 as seen in a direction perpendicular to the top plane. Alternatively or in combination with a knurling, larger depressed areas 18 may be provided such as the embodiment illustrated in FIG. 6a, where the larger depressed area is fully enclosed by regions 19 of the flat film-film welding portion 3, 4 lying in the top plane 10, or as the embodiment illustrated in FIG. 6b, where the regions 20, 21, 22 of the flat film-film welding portion 3, 4 lying in the top plane 10 only partially enclose the larger depressed area so as to define a U-shaped outline as seen in a direction perpendicular to the top plane 10. In FIG. 6b, region 20, the bottom of the U-shape, forms a first leg of the flat portion 3, 4 arranged along the edge towards the concave film-tube welding portion 7, and regions 21, 22, the legs of the U-shape, form secondary legs connected to the first leg, wherein the secondary legs extend away from the concave film-tube welding portion 7.

While the embodiments of FIGS. 4 and 6 show symmetric configurations, it should be noted that asymmetric configurations may be required for certain applications and may easily be configured by the skilled person. However, all embodiments of a sealing jaw 1 according to the invention comprise at least one substantially flat film-film welding portion 3, 4 that has at least one recess 11 adjoining the concave film-tube welding portion 7.

Figure 7:
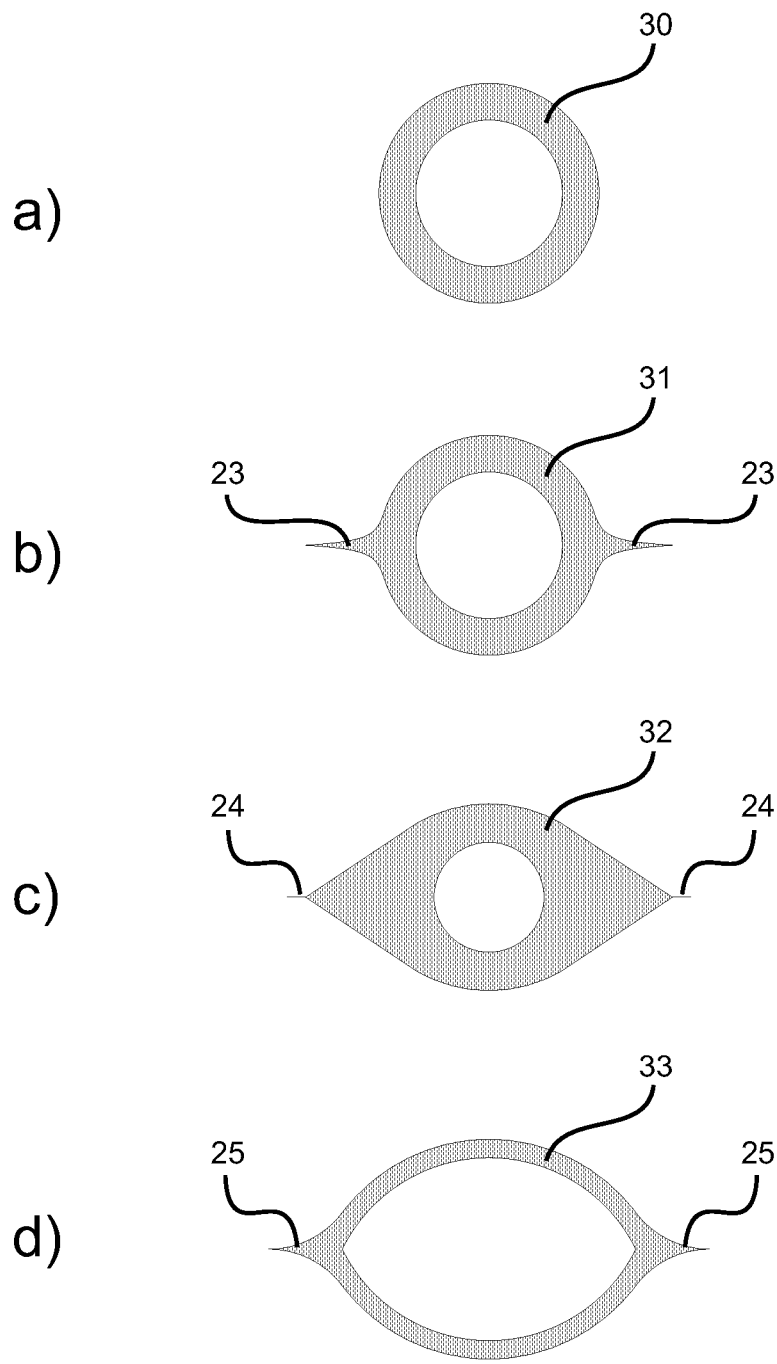

FIG. 7 shows examples of different cross-sectional shapes of the tube/connector part of the tube 30. Example (a) shows a tube of circular outer cross-section with a channel for fluid passage of circular cross-section. The remaining examples (b-d) are provided with a non-circular outer cross-section having wings 23, 24, 25 intended to facilitate the sealing of the branching point at the transition between the film-to-film attachment and the film-to-tube attachment by filling out the crotch between the portions of plastic film branching to embrace the tube in a sealing engagement. Nevertheless, it should be noted that also for such tube connector shapes 31,32,33 as illustrated in FIG. 7b-d the seal at the tip of the wings 23-25 is critical and requires particular attention as solved by the present invention.

Figure 8:
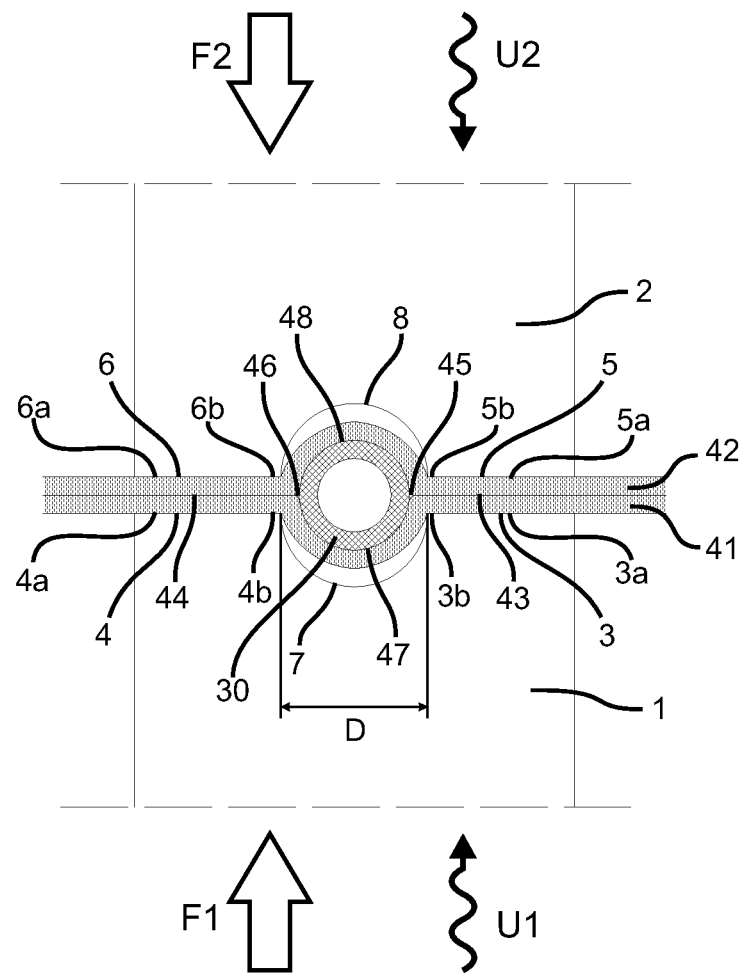
FIG. 8 is a diagrammatic sectional view of an apparatus for carrying out the method according to the invention.

FIG. 8 shows schematically a detail of an apparatus for performing the method according to the invention. Note that for example the film thickness is exaggerated as compared to the wall thickness and diameter of the tube.

The end of a tube, such as the circular tube connector 30 shown in FIG. 7a, is arranged between two plastic films 41, 42, so as to fully enclose the tube connector 30. The arrangement of tube connector 30 and the plastic films 41, 42 is placed between cooperating ultrasonic sealing jaws, such as the sealing jaws 1, 2 of FIG. 1, and clamped by the sealing jaws 1, 2 by applying clamping forces F1, F2 in a direction substantially perpendicular to the plane of the plastic films 41, 42.

Tube connector 30 jacketed by the plastic films 41, 42 is received by the concave film-tube welding portions 7, 8 of the sealing jaws 1, 2. In the schematic shown in FIG. 8, the transverse dimension D of the concave film-tube welding portions 7, 8 as seen in a direction parallel to joint faces 43, 44 roughly corresponds to the sum of the diameter of the circular tube connector 30 and twice the film thickness, wherein D preferably is chosen slightly less than that sum in order to apply a slight compressive pressure on the tube connector in the transverse direction parallel to joint faces 43, 44. Adjoining to either side of the centrally located concave film-tube welding portions 7, 8 of the sealing jaws 1, 2 flat film-film welding portions are arranged each having a proximal region 3b, 4b, 5b, 6b extending outwardly in the transverse direction from the concave film-tube welding portions 7, 8, and outwardly in extension of the proximal region 3b, 4b, 5b, 6b, a distal region 3a, 4a, 5a, 6a, respectively.

The distal regions 3a, 4a are arranged in a common plane defining a top plane for the first sealing jaw 1, whereas the distal regions 5a, 6a define a top plane of the second sealing jaw 2. The proximal regions 3b, 4b of sealing jaw 1 and the proximal regions 5b, 6b of sealing jaw 2 are each provided with a shallow recess with respect to the top plane. The recesses are open towards the concave film-tube welding portion.

As a result of the clamping forces F1, F2, flat portions 3a and 3b of sealing jaw 1 press film 41 from a first side towards the film-to-film joint face 43 and the flat portions 5a, 5b of sealing jaw 2 press film 42 towards the film-to-film joint face 43 from the opposite side. Correspondingly, flat film-film welding portions 4a, 4b of sealing jaw 1 and flat film-film welding portions 6a, 6b of sealing jaw 2 cooperate to press films 41 and 42 against a film-to-film joint face 44. Due to the recesses provided next to the concave film-tube welding portions, the pressure exerted on the film-to-film joints 43, 44 by the proximal regions 3b, 4b, 5b, 6b is reduced as compared to the pressure applied by the distal regions 3a, 4a, 5a, 6a.

The film-to-film joint face 43 meets the tube connector 30 in branching point 45. At the branching point 45 the plastic films 41, 42 part to follow the periphery of the tube connector 30, and meet again at branching point 46 where film-to-film joint face 44 meets the tube connector 30.

In the concave film-tube welding portion, plastic film 41 is arranged between the tube connector 30 and sealing jaw 1 so as to form the film-to-tube joint face 47, whereas plastic film 42 is arranged between the tube connector 30 and sealing jaw 2 so as to form film-to-tube joint face 48. The tube connector 30 is thus jacketed by the plastic films 41, 42 with joint faces 43, 47, 48 and 44. In order to provide a tube seal, sealing attachments have to be formed along these joint faces 43, 44, 47, 48.

A sealing engagement between the plastic film and tube connector 30 along the joint faces 47, 48 may be achieved by direct ultrasonic welding of the film to the tube, by stretching the film around the tube connector and/or attaching the film spot wise to the tube. The sealing engagement may be supported by gluing and/or by providing a starter edge for welding. A starter edge for welding may be an area designed or added in order to initiate weld formation. At the film-to-film joint faces 43, 44 sealing engagement is formed by ultrasonic welding.

In the embodiment shown schematically in FIG. 8 with exaggerated dimensions, the surface of the concave film-tube welding regions 7, 8 of the sealing jaws 1, 2 are at least in the beginning of the process, when contact is made with the plastic film in the flat film-film welding regions 3, 4, 5, 6, not in contact with the outer surface of films 41, 42. In this configuration, sealing engagement is mainly achieved by stretching the film around the tube connector. Ultrasonic energy may be transferred to the film-to-tube interfaces 47, 48 so as to provide ultrasonic welding of these interfaces in the case that contact at least partially is established between the surface of the concave film-tube welding portion 7, 8 and the films 41, 42 at a later step of the sealing process.

However, in typical embodiments, the concave film-tube welding portion 7, 8 of the sealing jaws 1, 2 is in contact with the film material 41, 42 in the concave film-tube welding portion 7, 8 of the sealing jaws 1, 2, thereby applying pressure to the sealing joints 47, 48 in these areas. In certain cases contact and pressure between the sealing jaws 1, 2 in the concave film-tube welding portion 7, 8 and the film material 41, 42 is established before contact and pressure builds up in the distal parts of the flat film-film welding regions 3a, 4a, 5a, 6a.

In some cases, when using certain tube materials not suited for achieving a weld between film and tube and/or when working with soft tube materials, the compressive pressure applied needs to be high, thus the cross-sectional area of the concave film-tube welding portions of cooperating sealing jaws for receiving the tube may be up to 25% less than the cross-sectional area of the tube.

Ultrasonic sealing is performed by transmitting ultrasonic energy U1 at a frequency Uf1 through sealing jaw 1, and optionally transmitting ultrasound energy U2 at a frequency Uf2 (different from Uf1) through sealing jaw 2 to the clamped plastic films 41, 42 and tube connector 30 at their joint faces 43, 44, 47, 48.

Preferred values for the ultrasound frequencies Uf1 and Uf2 of the ultrasound are selected from the ranges between 10 kHz and 100 kHz, alternatively between 20 kHz and 80 kHz, preferably between 25 kHz and 45 kHz with a difference between the ultrasound frequencies Uf1 and Uf2 of between 100 Hz and 10 kHz, preferably between 100 Hz and 5 kHz, most preferably between 100 Hz and 2 kHz.

In order to provide reliable attachment at the branching points 45, 46 while avoiding excessive build-up/transfer of ultrasonic energy, the pressure on the film-to-film joint faces 43, 44 is reduced in the proximal regions 3b, 4b, 5b, 6b of the flat film-film welding portions of the sealing jaws 1, 2. The recesses in the proximal regions 3b, 4b, 5b, 6b of the flat film-film welding portions are "sufficiently shallow" so as to still provide proper guidance for the plastic films 41, 42 and "sufficiently deep" to avoid excessive build-up/transfer of ultrasonic energy. For practical applications the depth of the recesses may be chosen to be comparable to, but less than the thickness of the plastic films.

The embodiment of FIG. 8 shows a tube connector 30 having a circular cross-section and corresponding sealing jaws 1,2 for providing an improved seal in particular in the critical region of the branching points 45, 46, where the film-film joints 43, 44 meet the film-tube joints 47, 48. However, corresponding branching points also exist when sealing tube connectors of non-circular cross-section in between portions of plastic film. As mentioned above, particular attention is also required in the critical region of these branching points for tube connectors of non-circular cross-section. The skilled person will understand that the teaching of the present invention also applies to tube connectors of no-circular cross-section. For example, when sealing portions of plastic film to the tube connector shapes 31, 32, 33 illustrated in FIG. 7b-d, branching points where film-film joints meet film-tube joints exist at the outmost tip of the wings 23, 24, 25. Also in these cases, the transverse dimension of the concave film-tube welding portions 7, 8 substantially corresponds to the transverse dimension of the respective tube connector, including protrusions 23, 24, 25. Accordingly, one or more shallow recesses are provided in proximal regions 3b, 4b, 5b, 6b of the film-film welding portions 3, 4, 5, 6 extending outwardly from the film-tube welding portions 7, 8. The shallow recesses are configured to reduce the pressure applied to the film-film joint next to the branching point at the outmost tip of the wings 23, 24, 25 of the tube connectors 31, 32, 33.

Figure 9:
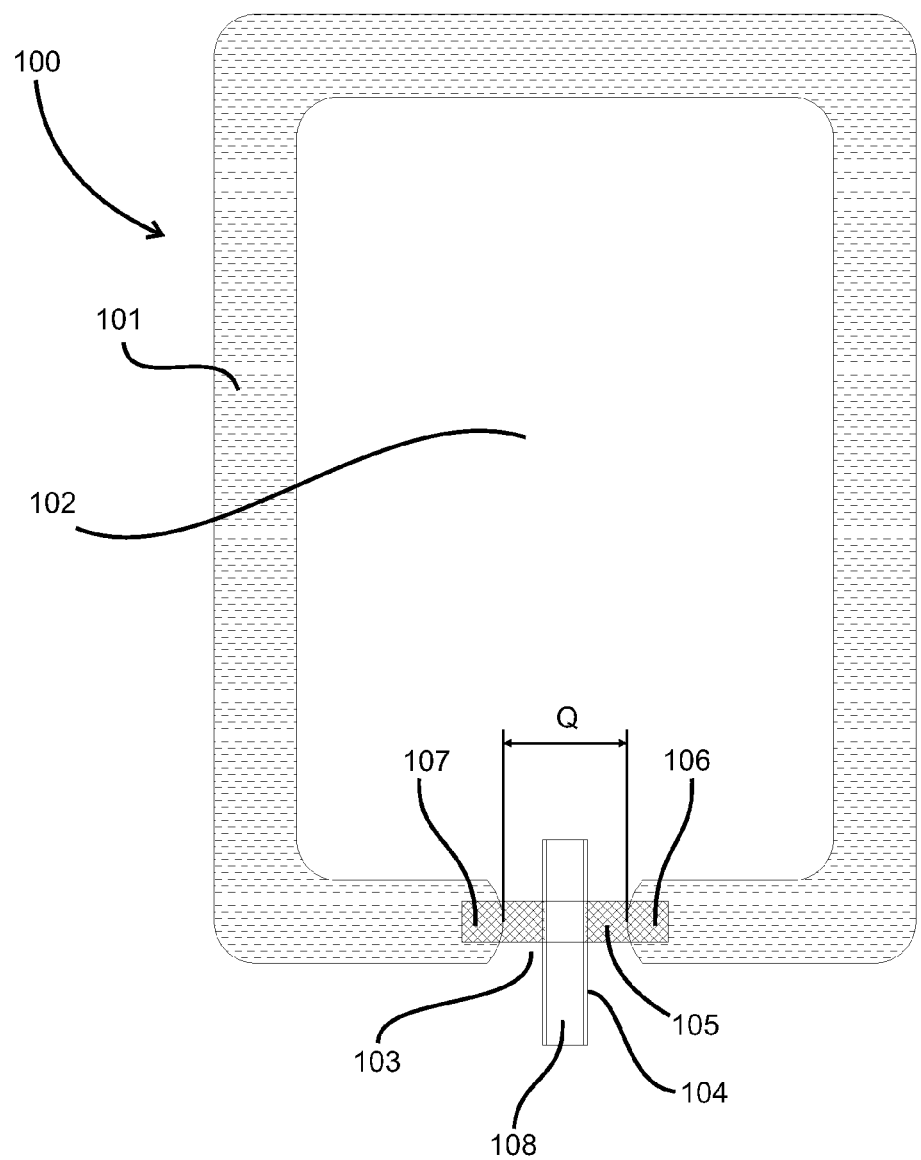
FIG. 9 is a sectional view through a drainage bag, in which a tube is welded between two bag walls of plastic film.

FIG. 9 shows an example of a liquid container 100 produced using the method for providing a tube seal according to the invention. Two plastic films are placed on top of each other and sealed along a seam 101 so as to define an internal volume 102, thereby providing a pre-fabricated liquid container bag with an opening 103 on the periphery providing access from the exterior to the internal volume 102 only through the opening 103. The transverse dimension Q of the opening 103 is chosen larger than half the largest circumference of the tube/tube connector 104 so as to be able to easily insert the tube/tube connector 104 into the opening 103 between the two plastic films. Finally the tube is sealed to the walls of the liquid container 100 using the method according to the invention, preferably using a sealing jaw according to the invention. The tube seal 105 is arranged such that the film-to-film attachments 106, 107 formed on either side of the tube 104 overlap the seam 101 of the pre-fabricated bag. Thereby a sealed liquid container 100 is provided where fluid connection between the exterior and the internal volume 102 may only be provided through the channel 108 defined by the tube 104.

Alternatively, the tube seal 105 may be produced first, thereby providing film-to-film attachments 106, 107 extending away from the tube. Subsequently, the seam 101 may be produced, wherein opening 103 is brought into alignment with the tube seal 105 such that seam 101 overlaps the film-to-film attachments 106, 107 and a sealed liquid container 100 is provided.

Figure 10:
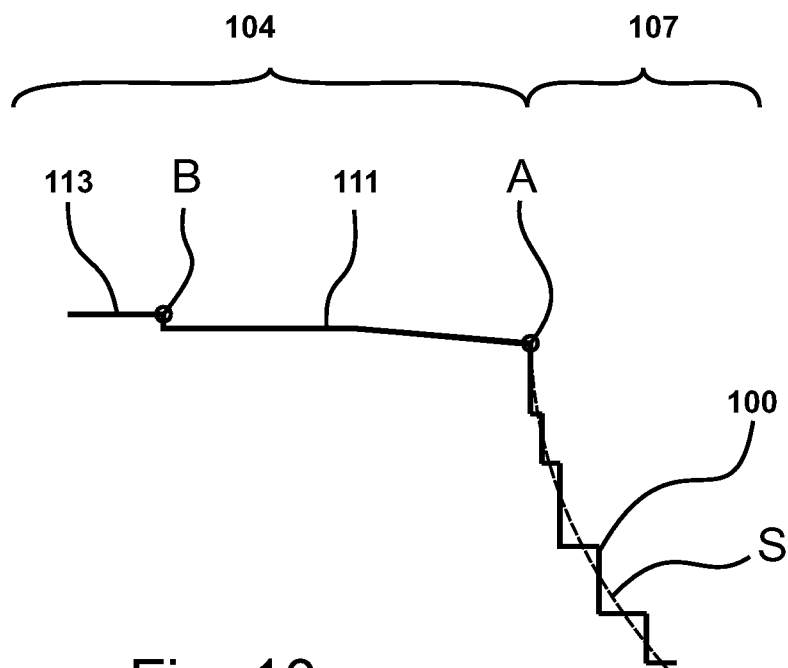
FIG. 10 shows a detail of a sealing jaw corresponding to detail II in FIG. 1, with a structured surface of the concave film-tube welding portion
Figure 11:
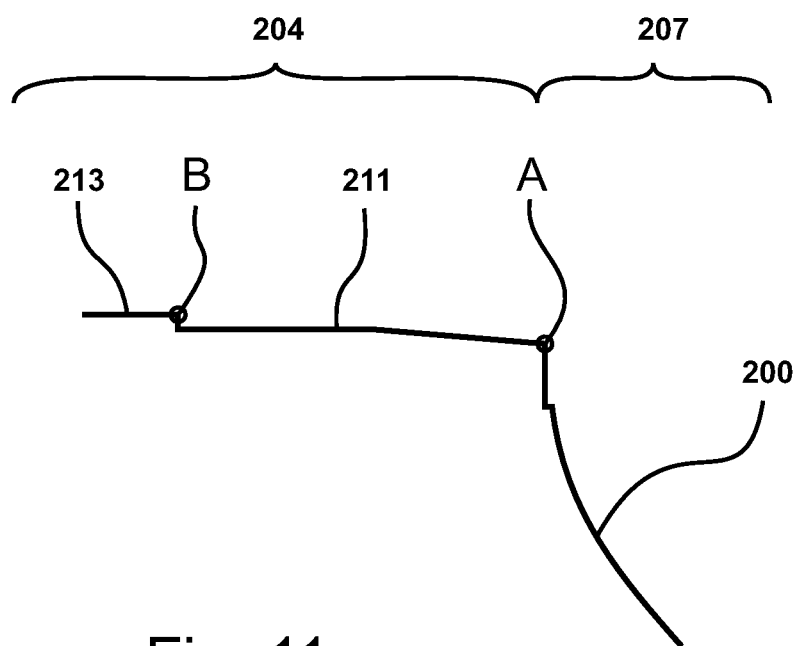
FIG. 11 shows a detail of a sealing jaw corresponding to detail II in FIG. 1, with a differently structured surface of the concave film-tube welding portion

FIG. 10 and FIG. 11 show a detail corresponding to FIG. 2 of advantageous embodiments of sealing jaws exhibiting a structured surface 100, 200 in the concave film-tube welding portion 107, 207. The surface 100, 200 of concave film-tube welding portion 107, 207 intersects with the surface of the recess 111 of the flat film-film welding portion 104, 204 in point A. The surface of the recess 111, 211 extends to point B, where it meets the most elevated regions of the flat film-film welding portion 104, 204 defining the top plane (not shown). As shown in FIG. 10, the overall shape of the concave film-tube welding portion 104, 204 may be approximated by a smooth average surface S averaging over the structuring of the surface 100.

The invention claimed is:

1. Ultrasonic sealing jaw (1) for sealing portions of plastic film to a tube so as to form a sealing engagement of the portions of plastic film around the circumference of the tube, the sealing jaw (1) comprising a concave film-tube welding portion (7) for receiving the tube covered by the plastic films, the film-tube welding portion (7) being adapted to form the film-tube attachment, and, adjacent to at least one side of the concave portion (7) of the sealing jaw (1), characterised in that the sealing jaw comprises a substantially flat film-film welding portion (3, 4) for engaging the plastic film and sealing adjacent portions of plastic film to each other in an area adjoining the tube, said film-film welding portion (3, 4) defining a top plane (10) of the sealing jaw (1), and the film-film welding portion (3, 4) comprises along the edge towards the film-tube welding portion (7) at least one recess with a surface (11) so as to form a cavity (12) with an opening towards the film-tube welding portion (7).

2. Sealing jaw according to claim 1, wherein the surface (11) of the recess extends from a first point A located at the film-tube welding portion (7) at a level h below the top plane (10) to a second point B located in the top plane (10) at a distance L from the first point A in a direction away from the film-tube welding portion (7) and parallel to the top plane (10), wherein the point A defines the intersection of the surface (11) of the recess with the film-tube welding portion (7) and point B defines the intersection of the surface (11) of the recess with the top plane (10).

3. Sealing jaw according to claim 2, wherein L is at least 0.1 mm, alternatively at least 0.2 mm preferably at least 0.3 mm, most preferably at least 0.5 mm and L is less than 10 mm, alternatively less than 5 mm, preferably less than 3 mm.

4. Sealing jaw according to claim 2, wherein h is between 0.01 mm and 0.3 mm, alternatively between 0.01 mm and 0.15 mm, preferably between 0.01 mm and 0.1 mm.

5. Sealing jaw according to claim 1, wherein the distance between the surface (11) of the recess and the top plane (10) is largest at the opening towards the film-tube welding portion (7) as seen in the direction perpendicular to the top plane (10).

6. Sealing jaw according to claim 5, wherein the surface (11) of the recess monotonously approaches the top plane (10) as seen in the direction from the film-tube welding portion (7) towards the film-film welding portion (4).

7. Sealing jaw according to claim 2, wherein the surface (11) of the recess comprises a step edge with a level difference d at point B, a first area (11b) extending from the step edge to an intermediate point P, the first area (11b) being substantially parallel to the top plane (10) at a distance d thereto, and a second area (11a) extending from the intermediate point P to point A at the film-tube welding portion (7), wherein the distance of the second area (11a) to the top plane (10) gradually increases from the level difference d at the intermediate point P to level h at point A, wherein level h is larger than level difference d.

8. Sealing jaw according to claim 7, wherein the second area (11a) is a plane that is inclined towards the film-tube welding portion (7) by an angle α with respect to the top plane (10), wherein the angle α is between 0.05 degrees and 20 degrees, alternatively between 0.2 degrees and 10 degrees, preferably between 0.5 and 5 degrees.

9. Sealing jaw according to claim 1, wherein a film-film welding portion (3,4) is provided on either side of the film-tube welding portion (7).

10. Sealing jaw according to claim 9, wherein both film-film welding portions (3, 4) comprise at least one recess so as to form a cavity (12) with an opening towards the film-tube welding portion (7).

11. Sealing jaw according to claim 1, wherein the film-film welding portion comprises at least one depression (16, 18, 28).

12. Sealing jaw according to claim 1, wherein the film-film welding portion as seen in a direction perpendicular to the top plane has a first leg (20) along the edge towards the film-tube welding portion (7) and at least a second leg (21, 22) connected to the first leg (20) and pointing away from the film-tube welding portion (7).

13. Apparatus for ultrasonic sealing of portions of plastic film in sealing engagement around a tube, the apparatus comprising cooperating sealing jaws (1, 2) configured to close around the tube and the portions of plastic film, so as to apply a pressure to the plastic film, and means for transferring ultrasonic energy to the plastic film and/or tube through at least one of the sealing jaws (1, 2), characterised in that at least one of the sealing jaws (1, 2) is a sealing jaw according to claim 1.

14. Apparatus according to claim 13, wherein ultrasonic energy (U1) with a first frequency (Uf1) is applied to the plastic film and/or the tube through a first sealing jaw (1) and ultrasonic energy (U2) with a second frequency (Uf2) is applied to the plastic film and/or the tube through a second sealing jaw (2) cooperating with the first sealing jaw (1) simultaneously.

15. Method for ultrasonic sealing of portions of plastic film (41, 42) to a tube (30) so as to form a sealing engagement of the portions of plastic film (41, 42) around the circumference of the tube (30) and sealing the portions of plastic film (41, 42) together in an area adjoining the tube, the method comprising the steps of arranging the tube (30) between the portions of plastic film (41, 42), engaging the portions of plastic film (41, 42) by means of cooperating sealing jaws (1, 2), thereby clamping the plastic film (41, 42) around the tube (30) in concave film-tube welding portions (7, 8) of the sealing jaws (1, 2) and pressing abutting portions of plastic film (41, 42) against each other by means of substantially flat film-film welding portions (3, 4, 5, 6) adjoining the film-tube welding portions (7, 8) of the sealing jaws (1, 2), applying a clamping force (F1, F2) to the sealing jaws (1, 2) in a direction substantially perpendicular to the film-film welding portions (3, 4, 5, 6), thereby exerting a pressure on the plastic film (41, 42) in contact with the sealing jaws (1, 2), and, by means of the sealing jaws (1, 2), applying ultrasonic energy (U1, U2) to the layers of plastic film (41, 42) and/or tube (30) during an exposure time, characterised in that the film-film welding portions (3, 4, 5, 6) comprise at least one proximal region (3b, 4b, 5b, 6b) extending from a first point A at the film-tube welding portion (7, 8) to a second point B a distance L away from the film-tube welding portion, and at least one distal region (3a, 4a, 5a, 6a) extending from point B in a direction away from the film-tube welding portion, wherein the pressure exerted on the plastic film by the at least one proximal region (3b, 4b, 5b, 6b) is reduced with respect to the pressure exerted by the at least one distal region (3a, 4a, 5a, 6a).

16. Method according to ultrasonic sealing of portions of plastic film (41, 42) to a tube (30) so as to form a sealing engagement of the portions of plastic film (41, 42) around the circumference of the tube (30) and sealing the portions of plastic film (41, 42) together in an area adjoining the tube, the method comprising the steps of arranging the tube (30) between the portions of plastic film (41, 42), engaging the portions of plastic film (41, 42) by means of cooperating sealing jaws (1, 2), thereby clamping the plastic film (41, 42) around the tube (30) in concave film-tube welding portions (7, 8) of the sealing jaws (1, 2) and pressing abutting portions of plastic film (41, 42) against each other by means of substantially flat film-film welding portions (3, 4, 5, 6) adjoining the film-tube welding portions (7, 8) of the sealing jaws (1, 2), applying a clamping force (F1, F2) to the sealing jaws (1, 2) in a direction substantially perpendicular to the film-film welding portions (3, 4, 5, 6), thereby exerting a pressure on the plastic film (41, 42) in contact with the sealing jaws (1, 2), and, by means of the sealing jaws (1, 2), applying ultrasonic energy (U1, U2) to the layers of plastic film (41, 42) and/or tube (30) during an exposure time, characterised in that the film-film welding portions (3, 4, 5, 6) comprise at least one proximal region (3b, 4b, 5b, 6b) extending from a first point A at the film-tube welding portion (7, 8) to a second point B a distance L away from the film-tube welding portion, and at least one distal region (3a, 4a, 5a, 6a) extending from point B in a direction away from the film-tube welding portion, wherein the pressure exerted on the plastic film by the at least one proximal region (3b, 4b, 5b, 6b) is reduced with respect to the pressure exerted by the at least one distal region (3a, 4a, 5a, 6a), wherein at least one of the sealing jaws (1, 2) is a sealing jaw according to claim 1.

* * * * *